United States Patent [19]
O'Brien, Jr. et al.

[11] Patent Number: 5,696,700
[45] Date of Patent: Dec. 9, 1997

[54] SYSTEM AND COMPUTER-IMPLEMENTED METHOD FOR FRACTAL-DIMENSION MEASUREMENT FOR TARGET-MOTION ANALYSIS NOISE DISCRIMINATION

[75] Inventors: Francis J. O'Brien, Jr., Newport; Chung T. Nguyen, Bristol; Sherry E. Hammel, Little Compton; Bruce J. Bates, Portsmouth; Steven C. Nardone, Narragansett, all of R.I.

[73] Assignee: The United States of America as represented by the Secretary of the Navy, Washington, D.C.

[21] Appl. No.: 494,674

[22] Filed: Jun. 26, 1995

[51] Int. Cl.⁶ .................................................. G06F 17/60
[52] U.S. Cl. .............................. 364/550; 364/554
[58] Field of Search .................... 364/550, 553, 364/554; 382/108, 173, 270, 277, 278; 342/90, 159, 195, 196; 128/745; 351/209, 210, 246

[56] References Cited

U.S. PATENT DOCUMENTS 5,054,101   10/1991   Prakash ........................ 382/270
5,212,506   5/1993   Yoshimatsu et al. ............. 351/210
5,365,941   11/1994   Yoshimatsu et al. ............. 128/745
5,504,487   4/1996   Tucker ........................... 342/90

*Primary Examiner*—James P. Trammell
*Attorney, Agent, or Firm*—Michael J. McGowan; Michael F. Oglo; Prithvi C. Lall

[57] ABSTRACT

A signal processing system and computer-implemented method for processing a digital data sequence representing an input signal to generate a fractal dimension value. The system includes a correlation integral value generation module, correlation plot generation module, a segmentation module, correlation dimension generation module, and a control module. The correlation integral value generation module generates a series of correlation integral values for points $w_n(k)$ in "N"-dimensional space corresponding to vectors of said digital data sequence, and in particular generates inter-point distance values within each of a plurality of volume elements of said "N"-dimensional space. The correlation plot generation module generates a correlation integral plot comprising a plot of the correlation integral values as a function of said "N"-dimensional space volume elements. The segmentation module generates, from the plot, a series of correlation integral plot segments.

14 Claims, 4 Drawing Sheets

SYSTEM AND COMPUTER-IMPLEMENTED METHOD FOR FRACTAL-DIMENSION MEASUREMENT FOR TARGET-MOTION ANALYSIS NOISE DISCRIMINATION

STATEMENT OF GOVERNMENT INTEREST

The invention described herein may be manufactured by or for the Government of the United States of America for Governmental purposes without the payment of any royalties thereon or therefor.

BACKGROUND OF THE INVENTION (1) Field of the Invention

The invention relates generally to the field of systems and methods for processing signals, and more particularly to a system for using chaos analysis techniques for determining the fractal dimension of a signal which exhibits chaotic structure.

(2) Description of the Prior Art

Phenomena known as "chaos" are pervasive in the natural world. Chaotic phenomena are studied by use of a number of commonly-accepted "defining" properties of information concerning the phenomena. Conventional measures of chaos include phase portrait analysis, determination of Lyapunov exponents, and estimation of the Hausdorff-Besicovitch or fractal dimension of "strange" attractors. Use of fractal dimension in testing for chaos has heretofore not been possible for many practical and useful systems, such as naval systems for underwater surveillance for presence of unfriendly submarines or underwater missiles by analysis of acoustic signals. The previous methodologies for measurement of fractal dimension have all required an intercession of subjective assessment by a human operator, which is deemed not practical for in-service use by the Navy.

The fractal dimension is an important defining property of a deterministic system in that the dimensionality does not follow the standard Euclidean classification, that is, the dimensionality need not be an integer. Accordingly, the fractal dimension does not necessarily conform to the Euclidean classification in which a point is said to have a dimensionality of zero, a line a dimensionality of one, a plane a dimensionality of two, and so forth. Determining the fractal dimension of a time series representing states of a system is a useful tool in determining whether the system is random or one that is defined by an attractor that is possibly chaotic.

SUMMARY OF THE INVENTION

It is therefore an object of the invention to provide a new and improved system and method for automatically estimating the fractal dimension of a time series which may represent samples of an input signal at successive points in time.

In brief summary, in one aspect the invention provides a signal processing system for processing a digital data sequence representing an input signal to generate a fractal dimension value. The system includes a correlation integral value generation module, correlation plot generation module, a segmentation module, correlation dimension generation module, and a control module. The correlation integral value generation module generates a series of correlation integral values for points $w_n(k)$ in "N"-dimensional space corresponding to vectors of said digital data sequence, and in particular generates an inter-point distance value for each pair of points, as the number of inter-point distance values within each of a plurality of volume elements of said "N"-dimensional space. The correlation plot generation module generates a correlation integral plot comprising a plot of the correlation integral values as a function of said "N"-dimensional space volume elements. The segmentation module generates, from the correlation integral plot, a series of correlation integral plot segments which represent overlapped portions of the digital data sequence. The correlation dimension generation module generates, from each correlation integral plot segment in the segment, a tangent mapping comprising a best-fit linear curve defined by a segment statistical correlation value and a segment slope value, and saves the segment statistical correlation value having the largest value along with the associated segment slope value. The control module controls the operations of the other modules through a series of iterations through successive iterations, and determines whether the segment slope values generated during the successive iterations approach an asymptotic value and if so uses the asymptotic value as the fractal dimension value.

In another aspect, the invention provides a computer-implemented method for processing a digital data sequence representing an input signal to generate a fractal dimension value in a series of iterations. In each iteration, each iteration being in relation to an "N"-dimensional space, a series of correlation integral values for points $w_n(k)$ in "N"-dimensional space are generated corresponding to overlapping vectors of said digital data sequence, each correlation integral value in the series being generated as the number of inter-point distance values within each of a plurality of volume elements of said "N"-dimensional space. A correlation integral plot is generated comprising a plot of the correlation integral values as a function of said "N"-dimensional space volume elements. From the correlation integral plot, a series of correlation integral plot segments which represent overlapped portions of the digital data sequence are generated, and from each correlation integral plot segment in the segment, a tangent mapping is generated comprising a best-fit linear curve defined by a segment statistical correlation value and a segment slope value, and the segment statistical correlation values having the largest value and the associated segment slope value are saved. The operations are controlled through a series of successive iterations. If the segment slope values generated during the successive iterations approach an asymptotic value, the asymptotic value is the fractal dimension value.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

The invention provides a system and computer-implemented method for automatically generating the fractal dimension of a time series of, for example, a series of data samples generated in response to an input signal which, in one embodiment, is obtained from an ocean environment. In this and numerous other environments, the input signal may represent, in addition to a signal which is desired to be detected for analysis, noise generated by the environment.

Figure 1:
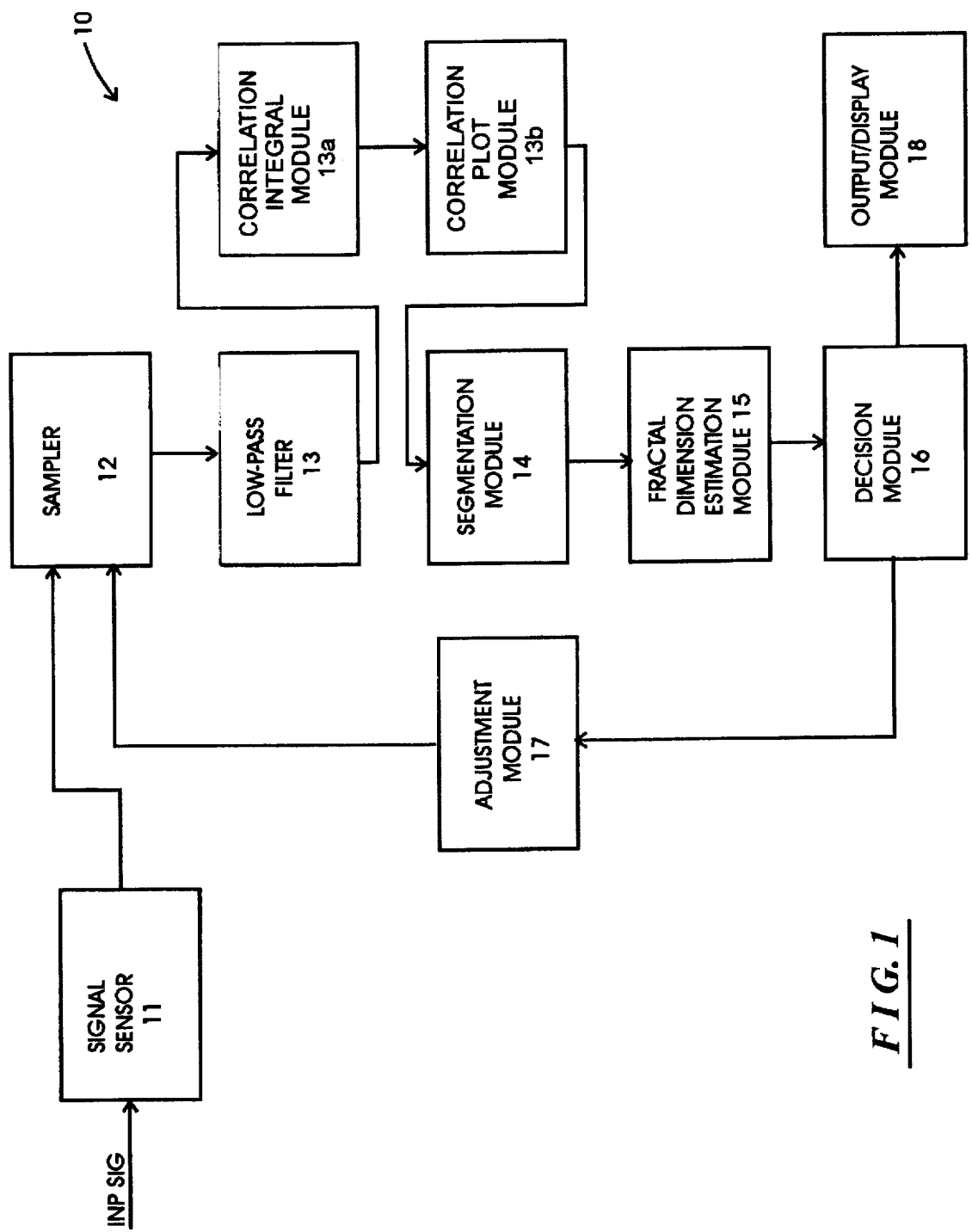
FIG. 1 is a functional block diagram of a fractal dimension analysis system constructed in accordance with the invention.

FIG. 1 is a functional block diagram of a fractal dimension analysis system 10 constructed in accordance with the invention. With reference to FIG. 1, the system includes a sensor 11, a sampler 12, a low-pass filter 13, a correlation integral module 13a, a correlation plot module 13b, a segmentation module 14, a fractal dimension estimation module 15, a decision module 16, an adjustment module 17 and an output/display module 18. The sensor 11 receives an input signal INP SIG, which includes noise and a signal component comprising the intelligence to be processed. In the embodiment in which the input signal is obtained from an ocean environment, the input signal will illustratively be in the form of an acoustic signal, which the signal sensor converts to electrical form for provision to the sampler 12.

The sampler 12, in turn, receives the electrical signal provided by the signal sensor 11, samples the electrical signal at successive points in time and generates, at each time, a digital data sample D(t) representing the amplitude of the electrical signal at the corresponding time "t". The stream of data samples {D(t)} generated by the sampler 12 is low-pass filtered by the low-pass filter 13, which performs low-pass filtering in connection with any conventional digital filtering methodology to generate a filtered data stream $\{D_F(t)\}$.

The filtered data stream $\{D_F(t)\}$ generated by the filter module 13 is successively processed by correlation integral module 13a, correlation plot module 13b and segmentation module 14. As will be described in connection with the flow chart in FIG. 2 (Cont. A), the process of providing the data stream is iteratively controlled to segment the data stream. The segmentation module 14 and fractal dimension estimation module 15 cooperate to generate, in response to a the filtered data stream $\{D_F(t)\}$, an estimate of the fractal dimension "d" for the input signal INP SIG. More specifically, the segmentation module 14 and fractal dimension estimation module 15 will process a sequence of the filtered data stream $\{D_F(t_0), \ldots, D_F(t_N)\}$ comprising "N" successive filtered data samples $D_F(t_s)$ to generate an estimate of the fractal dimension for the sequence. The operations performed by the correlation integral module 13a, correlation plot module 13b, segmentation module 14 and fractal dimension estimation module 15 will be described in detail below in connection with the flow chart in FIG. 2.

Generally, the segmentation module 14 and fractal dimension estimation module 15 will operate to generate fractal dimension estimates in connection with sequences $\{D_F(t_0), \ldots, D_F(t_N)\}$ of "N" successive filtered data samples $D_F(t_s)$ beginning with each successive time $t_r$. The decision module 16 will receive the successive fractal dimension estimates from the fractal dimension estimation module 15 and determine whether they converge asymptotically to a particular value. If not, the decision module 16 controls the adjustment module 17 to adjust the various operational parameters of the sampler 12, such as the sampling interval, and the operations are repeated. On the other hand, when the decision module 18 determines that successive fractal dimension estimates are converging asymptotically to a particular value, it will provide the value to the output/display module 18 for display to an operator.

As noted above, the segmentation module 14 and the fractal dimension estimation module 15 cooperate to generate an estimate of the fractal dimension of a sequence of filtered digital data samples $D_F(t_s)$ in a filtered data stream. By way of background, assume that states of a dynamical system (which may be represented by the filtered data samples $D_F(t_s)$, for example) can be described by a set of non-linear differential equations $$x(t) = f(x, t; u); \quad x(t_0) = t_0 \tag{1}$$

where "x" represents the state of the system at time "t" and "u" represents a set of system parameters. Assume further that the observations available for analysis are defined by $$y(t) = h(x, t) + n(t) \tag{2}$$

where "h" represents a "measurement function" and "n(t)" represents a stochastic process such as noise. In chaos analysis, an "embedded space" can be generated by forming a history of vectors whose components are the continuous time histories of the observed samples of y(t). The sequence so defined can be viewed as a sequence of "K" points, such that $$w(1) = [y(t_0), y(t_0 + \tau), \ldots, y(t_0 + (2n)\tau)]^T \tag{3}$$

$$w(2) = [y(t_0 + \tau), y(t_0 + 2\tau), \ldots, y(t_0 + (2n+1)\tau)]^T$$

.
.
.

$$w(K) = [y(t_0 + (K-1)\tau), y(t_0 + K\tau), \ldots, y(t_0 + (2N + K - 1)\tau)]^T,$$

where "τ" is the sampling period, 2N is the dimension of the embedded space, and T represents the matrix transpose operator. If the original chaotic attractor was in an N-dimensional phase space, then a 2N+1-dimensional embedded space is sufficient to capture its topological features. The parameters τ, the sampling time, and N, the dimensionality of the phase space, must be selected. The value of N may be unknown a priori, and must be determined by experimental computations based on increasing values until a limiting value is approached. Generating the fractal dimension is a component of this operation.

The generation of the fractal dimension entails generating a "correlation dimension," which is defined as $$D_{cor} = \lim_{\epsilon \to 0} \frac{\ln \sum_{i=1}^{N(\epsilon)} P_i^2}{\ln \epsilon}, \tag{4}$$

where N(ε) is a volume element of an attractor, each with diameter ε, and $P_i$ is the relative frequency with which the typical orbiting trajectory, defined by the sample sequence, enters the i-th volume element. A value for $P_i$ can be generated by obtaining an N-dimensional trajectory and generating the probability that sampled points $n_i$ lie inside the i-th volume element. In this procedure, the relative frequency ratio $$P_i = \lim_{n \to \infty} \frac{n_i}{N} \tag{5}$$

is generated. Since the volume elements N(ε) all lie within distance ε from each other, and $n_i(n_i-1)$ pairs of distances are involved, then the correlation integral of the points (that is, the data samples) is defined as $$C(\epsilon) = \lim_{N \to \infty} \frac{1}{N^2} PPD, \quad (6)$$

where "PPD" represents the number of pairs of points $(x_i, x_j)$ for which distance $\|x_i - x_j\| < \epsilon$. It can be demonstrated from equation (6) that $$C(\epsilon) = \lim_{\epsilon \to 0} \frac{\sum_{i=1}^{N(\epsilon)} n_i(n_i - 1)}{N^2} = \sum_{i=1}^{N(\epsilon)} P_i^2 \quad (7)$$

With the definition for $C(\epsilon)$ in equation 7, the correlation dimension (equation 4) corresponds to $$D_{cor} = \lim_{\epsilon \to 0} \frac{\ln C(\epsilon)}{\ln \epsilon}, \quad (8)$$

which corresponds to the slope of the curve of a plot of ln $C(\epsilon)$ as a function of ln $\epsilon$ (although the logarithms may be taken to any convenient base, such as base two if computations are being performed by a computer).

Accordingly, generating the correlation dimension $D_{cor}$ normally entails generation of the correlation integral $C(\epsilon)$, which, in turn, involves determination of the interpoint distances between the vectors $w(k)$ (equation 3). It will be appreciated that, for each pair of vectors or points $w(i)$, $w(j)$, the inter-point distance value corresponds to $$r_{ij} = \sqrt{\sum_{n=1}^{2N} w_n^2(i) - w_n^2(j)}, \quad (9)$$

where "n" refers to the successive dimensions comprising the components of the respective vectors. Stated another way, what is involved as the result of application of this equation in light of equation (3) is the generation of a series of correlation integral values for points $W_n(k)$ in "N"-dimensional space corresponding to the vectors of said digital data sequence. For each inter-point distance so generated, a volume element $N(\epsilon_i)$ can be identified which just contains the inter-point distance value $r_{ij}$, but for which the next smaller volume element $\epsilon_{i-1}$ does not, that is, $\epsilon_{i-1} < r_{ij} \leq \epsilon_i$. Further, for all of the inter-point distances generated using equation 9, if $\epsilon_l$, $l=0,1,\ldots$, are deemed to be diameters of the various-sized volume elements $N(\epsilon)$ as defined above, the variables $\epsilon_l$ effectively defines a series of "bins" to which each inter-point distance $r_{ij}$ can be assigned according to the above-noted relation $\epsilon_{i-1} < r_{ij} \leq \epsilon_i$. As the interpoint distances are generated, a running count can be maintained of the number of points assigned to each bin, which can be used in generating the correlation integral values in accordance with equation 7. After all of the inter-point distances have been generated, a log-log plot can be generated (in a computer implementation with the logarithms conveniently taken to the base two) for the correlation integral values as a function of the bin values, that is, generating a plot depicting $\log_2 C(l)$ as a function of $\log_2 \epsilon_l$.

After the plot of $\log_2 C(l)$ as a function of $\log_2 \epsilon_l$ is generated, in accordance with the invention, the plot is segmented and processed as described below to generate an estimate of the fractal (correlation) dimension. In that operation, segments of the $\log_2 C(l)/\log_2 \epsilon_l$ plot are initially generated as follows. If it is assumed that segments have a minimum number of four plot points, at a particular dimension D the segments may be defined as $$f(j,i,d) = S_{jid} = \{l_{id}^{i+j+2}\}_{i=1}^{N_d-j-2}, j \in [1, Z_D], Z_D = N_d-3, d \in [2, D] \quad (10)$$

where "l" represents a segment. Note that in the description of the operation of segmentation module 14, below, this is referred to as the maximum dimension value $d_{max}$. The set elements in equation (10) comprise sequences of four or more weighted ordered pairs of values for dimension "d"; that is, $$f(j,i,d) = \{x_{id} y_{id} f_{id}\}, j \in [1, Z_d] \quad (11),$$

where $x_{id}$ is the integer abscissa point on interval $\log_2(\epsilon)$, $y_{id}$ is the corresponding ordinate value on interval $\log_2 C(\epsilon)$ and $f_{id}$ is a weighting factor or bin count. To accelerate operations, segments that contain zero (non-decreasing or non-increasing) slopes may be eliminated; that is, for segments in which $(y_{id} - y_{i-1,d}) = 0$, then the segment $[(x_{i-1,d}, y_{i-1,d}, f_{i-1,d}); (x_{i,d}, y_{i,d}, f_{i,d})]$ may be set to zero.

Generally, a mapping from an element $S_{jid}$ to a weighted ordered pair sequence $\{x_{id}\ y_{id}\ f_{id}\}$ is established by $$S_{jid} = \{l_{id}^{i+j+2}\}_{i=1}^{N_d-j-2} \to (l_{id}^{i+j+2}) \to \{x_{id} y_{id} f_{id}\}_i^{i+j+2} \quad (12),$$

where $$(l_{id}^{i+j+2}) = l_{i,i+1}, \ldots, _{i+j+2} \text{ for all } (i,j) \quad (13).$$

For example $$S_{ijd} = S_{14d} = (l_{id}^7) = l_{4567}, \text{ for } d \in [2, D] \quad (14).$$

As a specific example, assume that the segmentation module makes use of twelve bins (defined by $\epsilon$ above), such that $N_D = 12$. After nulling segments of zero slope, the series of segments are defined as:

$$S_{2id} = \{l_{id}^{i+4}\}_{i=1}^{8}$$

$$S_{3id} = \{l_{id}^{i+5}\}_{i=1}^{7}$$

$$S_{4id} = \{l_{id}^{i+6}\}_{i=1}^{6}$$

$$S_{5id} = \{l_{id}^{i+7}\}_{i=1}^{5}$$

$$S_{6id} = \{l_{id}^{i+8}\}_{i=1}^{4}$$

$$S_{7id} = \{l_{id}^{i+9}\}_{i=1}^{3}$$

$$S_{8id} = \{l_{id}^{i+10}\}_{i=1}^{2}$$

$$S_{9id} = \{l_{id}^{i+11}\}_{i=1}^{1} = S_{Z_d id} \quad (15).$$

Applying $S_{jid}$ repeatedly produces the desired sequence set of weighted ordered pairs of sequences from size four (that is four points per sequence) to $N_d$. In general, $S_{jid}$ is given as shown above (equation 10):

$$S_{jid} = \{l_{id}^{i+j+2}\}_{i=1}^{N_d-j-2}, j \in [1, Z_d], Z_d = N_d-3, d \in [2, D] \quad (16).$$

The sequence defined in equation 10 (or equation 16) actually represents a composite sequence, which can be written as $$f(j,i,d) = \{\{l_{id}^{i+j+2}\}_{j=1}^{N_d-3}\}_{i=1}^{N_d-j-2} \quad (17).$$

In the illustrative case in which $N_d=12$, $S_{jid} = \{S_{1id}, S_{2jd}, \ldots, S_{Zdid}\}$, $j \in [1, Z_d]$, where $Z_d = N_d-3 = 9$, from equation 16, $$S_{jid} = \{l_{id}^{i+j+2}\}_{i=1}^{10-j}, j \in [1, 9] \quad (18),$$

and the "(j,i)-th" element can be written $$(l_{id}^{i+j+2}), j \in [1, 9] \quad (19),$$

which maps onto a sub-sequence of weighted ordered pairs as $$\{x_{id} y_{id} f_{id}\}_i^{i+j+2} \quad (20).$$

The total number of all segments in set $S=\{S_{11d}, S_{12d}, \ldots S_{jid}, \ldots S_{Zd,Nd-j-2,d}\}$, for $N_d$ bins at dimension "d" corresponds to $$N_{Z_d} = \sum_{j=1}^{Z_d} j = Z_d\left(\frac{Z_d+1}{2}\right) = \frac{(N_d-2)(N_d-3)}{2} \quad (21)$$

for the situation in which the minimum segment length is four consecutive samples. In general, if the minimum segment size is "w", then $$N_{Z_d} = \frac{(N_d-w+1)(N_d-w+2)}{2}, \quad (22)$$

and the total number of elements for all dimensions d=2 to D is $$N_Z = \sum_{j=1}^{Z_d} N_{Z_d} = \frac{1}{2}\sum_{d=2}^{D}(N_d-w_d+1)(N_d-W_d+2), \quad (23)$$

where $w_d$, the minimum width parameter (minimum number of points per segment) may vary across dimensions d.

Thus, assuming a bin count (number of values of $\epsilon$ above) of $N_d=12$, the $N_d-3=9$ elements in the first subset of segments (each including four plot points) is $$S_{1jd} = \{I_{1d}^{i,i+2}\}_{i=1}^{9} \quad (24)$$

$$= I_{1234}; I_{2345}; I_{3456}; I_{4567}; I_{5678}; I_{6789}; I_{789,10}; I_{89,10,11}; I_{9,10,11,12}.$$

After the segments are generated as described above, the correlation dimension can be generated. In that operation, a best-fit linear curve (that is, a tangent) is generated using least-squares fit procedures, and from the tangent mappings a curve fitting index $$\rho(1_{id}^{i,i+2}) \rightarrow \rho\{x_{id}y_{id}f_{id}\}_{i}^{i,i+2} \quad (25)$$

and an element slope tangent $$\beta(1_{id}^{i,i+2}) \rightarrow \beta\{x_{id}y_{id}f_{id}\}_{i}^{i,i+2} \quad (26)$$

are generated, where $\rho$ represents the segment statistical correlation value and $\beta$ represents the linear regression model slope value which are generated as $$\rho_{jid} = \frac{N_{jid}\sum_{\text{all }jid}f(x,y)xy - \sum_{\text{all }jid}f(x)x \sum_{\text{all }jid}f(y)y}{N_{jid}(N_{jid}-1)\sigma_{x_{jid}}\sigma_{y_{jid}}} \quad (27)$$

$$= \beta_{jid}\frac{\sigma_{x_{jid}}}{\sigma_{y_{jid}}}$$

where $\sigma_x$ and $\sigma_y$ are segment standard deviations generated as $$\sigma_{x_{jid}} = \frac{\sqrt{N_{jid}\sum_{\text{all }jid}f(x)x^2 - \left[\sum_{\text{all }jid}f(x)x\right]^2}}{N_{jid}(N_{jid}-1)} \quad (28)$$

and $$\sigma_{y_{jid}} = \frac{\sqrt{N_{jid}\sum_{\text{all }jid}f(y)y^2 - \left[\sum_{\text{all }jid}f(y)y\right]^2}}{N_{jid}(N_{jid}-1)}, \quad (29)$$

where $N_{jid}$ is the segment sample size, or the number of points of the $\log_2 C(l)/\log_2 \epsilon_l$ plot in a segment ($N_{jid} \geq 4$ in the illustrative embodiment described herein) and f(x), f(y) and f(x,y) are the weights associated with the grouped-data least squares value.

After generating the values for $\rho$ and $\beta$ for all segments, the highest value for $\rho$, and the associated value for $\beta$, are selected for each sequence $S_{jid}$. After repeating the operations for each dimensional space in which embedding is performed, the best overall fit is selected as the correlation dimension as:

$$D_{cor} = \beta\left\{\max_{\text{all }jid}\rho[f(j,i,d)]alljid\right\}, \quad (30)$$

where f(j,i,d) is as defined in equation 10.

Figure 2:
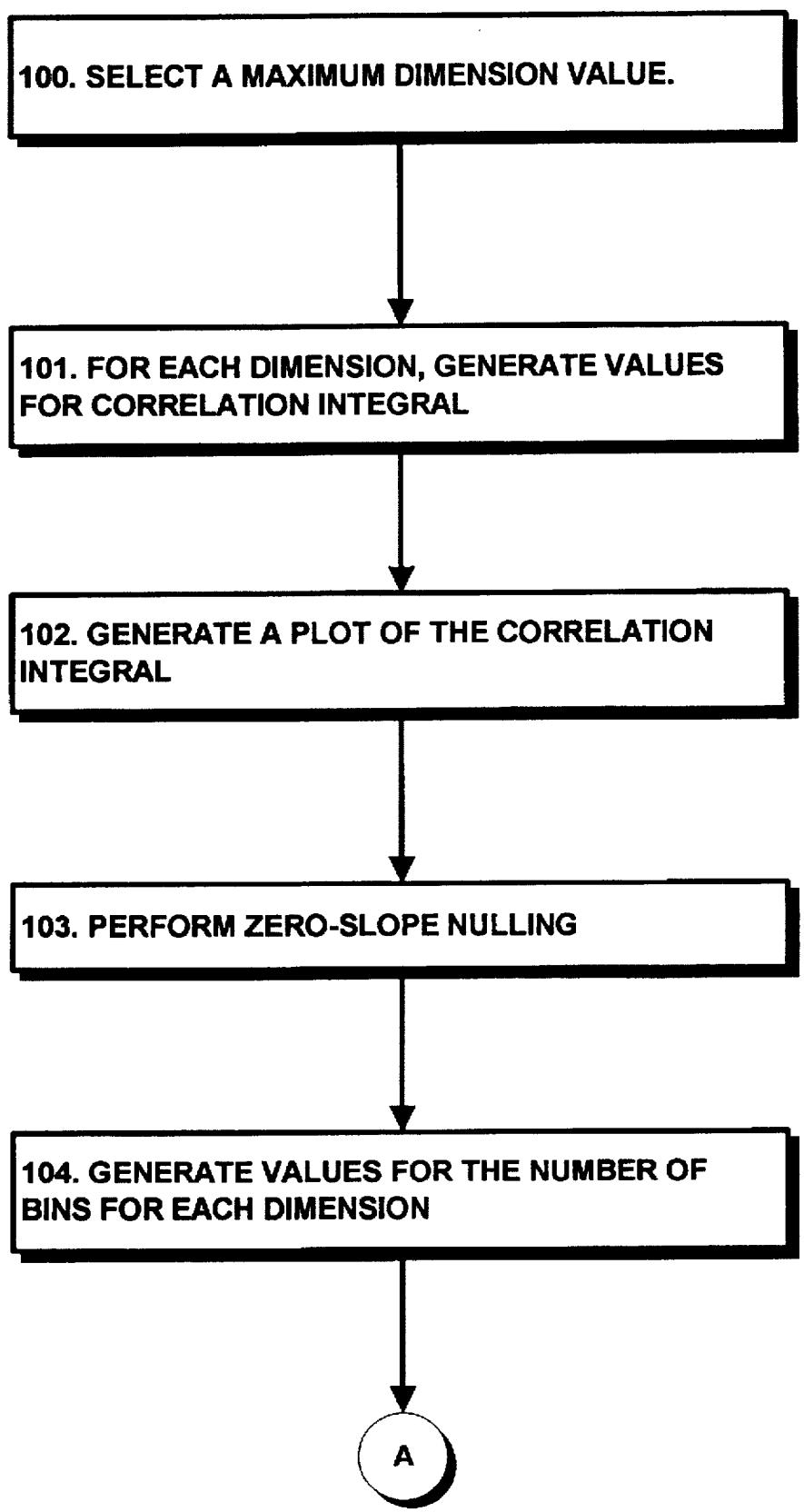
FIGS. 2, 2 (Cont. A) and 2 (Cont. B) jointly comprise a flow diagram depicting the operations performed by the fractal dimension analysis system depicted in FIG. 1, with FIG. 2 (Cont. A) depicting the continuation of operations from FIG. 2, and FIG. 2 (Cont. B) depicting the continuation of operations from FIG. 2 (Cont. B).

With this background, the operations of the segmentation module 14 and fractal dimension estimation module 15 will be described in connection with the flow chart in FIGS. 2, 2 (Cont. A) and 2 (Cont. B). With reference to FIG. 2, the segmentation module 14 initially selects a maximum dimension value $d_{max}$ (step 100) (corresponding to "D" above), and, for each dimension "d" from 2 to $d_{max}$, it generates, from the sequence of filtered data samples $D_F(t_s)$ a series of vectors w(k) (equation 3) and from the vectors generates values for $\epsilon$ and correlation integral C($\epsilon$) as described above (step 101) and a plot of the correlation integral C($\epsilon$) as a function of $\epsilon$ (step 102). It will be appreciated that the function performed by the step 101 basically corresponds to that provided by correlation integral module 13a, FIG. 1 and the function performed by step 102 basically corresponds to that performed by correlation plot module 13b, FIG. 1. The segmentation module then eliminates points of each plot for which the slope is zero (step 102), and generates corresponding values for $N_d$, the number of bins defined by $\epsilon$ for each dimension (step 103). It will also be appreciated that equations (3) and (8) are performed as part of step 101 (in the depiction of FIG. 1, as part of correlation integral module 13a).

After generating, for each dimension d, the $\log_2 C(l)/\log_2 \epsilon_l$ plot and the $N_d$ value, the modules 14 and 15, for each dimension d, perform a series of steps to segment the plot associated with the dimension and to generate the tangent mappings and associated slope and correlation values. In that operation, the segmentation module 14 generates the "Z" contiguous segment sequences $S_{jid}$ for "j" from "1" to "$N_d-3$" and "i" from "1" to "$N_d-j-2$" (step 105) as described above in connection with equations 10 through 18. After generating the segments for a dimension d, the segmentation module 14 passes them to the fractal dimension estimation module 15, which generates the weighted tangent mappings in accordance with the ordinary least squares methodology as described above (step 106). From the weighted tangent mappings, the module 15 generates the segment statistical correlation value $\rho$ and the associated linear regression model slope value $\beta$ (step 107) in accordance with equation 27 above. The fractal dimension estimation module 15 then saves the maximum segment statistical correlation value $\rho$ and the associated slope value $\beta$ as statistics for the particular dimension d (step 108). It will be appreciated that the aforesaid assumption that a segment of the plot has a minimum number of four plot points, in light of the data transformations produced by successive iterations through equations (9) through (30), results in the correlation integral plot segments representing overlapped portions of filter data stream $\{D_F(*)\}$.

The segmentation module 14 and fractal dimension estimation module 15 repeat these operations for successive dimensions d from d=2 to $d_{max}$, in each iteration generating a segment statistical correlation value $\rho$ and the associated slope value $\beta$ (step 109). After generating values for successive dimensions, the decision module 16 determines whether they approach an asymptotic value (step 110), and if so uses the value as the correlation dimension (step 112). In determining whether the values approach an asymptotic value, the decision module may determine whether differences between successive segment statistical correlation values ρ and the associated slope values β are less than a predetermined threshold value (in one embodiment, selected to be $10^{-2}$). If, on the other hand, the decision module 16 determines that the values do not approach an asymptotic value, it may adjust various operational parameters, including the sampling interval used by the sampler 12 and the number of dimensions $d_{max}$ and enable the operations to be repeated (step 112).

The invention provides a number of advantages. In particular, it provides an automated system and computer-implemented method for generating the fractal dimension, which eliminates subjective human operator-based methodologies which have been practiced heretofore.

While the invention has been described in relation to segmentation in which the minimum segment size "w" is four points of the $\log_2 C(\epsilon)/\log_x \epsilon$ plot, it will be appreciated that the minimum segment size may be any convenient value. In that case, for equation 10, the ranges of i and j can be redefined as $$i \in [1, N_d-j-w+2]; \; j \in [1, N_d-w+1] \qquad (31).$$

In that case, equation 10 becomes $$f(j,i,d) = \{\{1_{id}^{i+j+w+2}\}_{j=1}^{N_d-w+1}\}_{i=1}^{N_d-j-w+2} \qquad (32),$$

where the value for "w," the minimum segment size must be specified for a particular application. In that case, the induced mapping (equation 12 above) is generalized as $$\{\{1_{id}^{i+j+w-2}\}_{j=1}^{N_d-w+1}\}_{i=1}^{N_d-j-w+2} \to (1_{id}^{i+j+w-2}) \to \{x_{id}y_{id}f_{id}\}_{i}^{i+j+w}(33).$$

It will be appreciated by those skilled in the art that the new fractal dimension analysis system 10 can be implemented using special-purpose hardware, or a suitably programmed general purpose digital computer, with the programming implementing the steps depicted in the flow-chart (FIG. 2).

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A signal processing system for processing a digital data sequence representing an input signal to generate a fractal dimension value, said system comprising:

a digital data generating module including a sensor for receiving an input signal, and a sampler for sampling the input signal and generating the digital data sequence representing an amplitude value of said input signal at successive points in time;

a correlation integral value generation module for generating a series of correlation integral values for points wn(k) in "N"-dimensional space corresponding to overlapping vectors of said digital data sequence, the correlation integral value generation module generating an inter-point distance value for each pair of points, the correlation integral value generation module generating each correlation integral value in the series as the number of inter-point distance values within each of a plurality of volume elements of said "N"-dimensional space;

a correlation plot generation module for generating a correlation integral plot comprising a plot of the correlation integral values as a function of said "N"-dimensional space volume elements;

a segmentation module for generating, from the correlation integral plot, a series of correlation integral plot segments, the segments of the series representing overlapped portions of the digital data sequence;

a correlation dimension generation module for generating, from each correlation integral plot segment in the segment, a tangent mapping comprising a best-fit linear curve defined by a segment statistical correlation value and a segment slope value, the correlation dimension generation module saving the segment statistical correlation value having the largest value and the associated segment slope value; and a control module for determining whether the segment slope values generated during the successive iterations approach an asymptotic value and if so using the asymptotic value as the fractal dimension value and if not adjusting at least one sampling parameter used by the sampler in sampling the input signal.

2. A signal processing system as defined in claim 1 in which the segmentation module generates the series of correlation plot segments $S_{jid}$ as:

$$S_{jid} = \{\{1_{id}^{i+j+w-2}\}_{j=1}^{N_d-w+1}\}_{i=1}^{N_d-j-w+2} \to (1_{id}^{i+j+w-2}) \to \{x_{id}y_{id}f_{id}\}_{i}^{i+j+w-2}$$

where "w" is the minimum segment size and "d" is the dimension.

3. A signal processing system as defined in claim 2 in which the segmentation module generates the series of correlation plot segments with a minimum segment size "w" of four.

4. A signal processing system as defined in claim 1 in which the correlation dimension generation module includes:

tangent mapping generating means for generating a tangent mapping for each correlation plot segment;

segment statistical correlation value generation means for generating a segment statistical correlation value for each tangent mapping; and segment slope value generation means for generating a segment slope value for each tangent mapping.

5. A signal processing system as defined in claim 4 in which the tangent mapping generating means uses a predetermined least-square fit procedure in generating the tangent mapping.

6. A signal processing system as defined in claim 4 in which the segment statistical correlation value generation means generates the segment statistical correlation value ρ and the segment slope value β as $$\rho(1_{id}^{i+j+2}) \to \rho \{x_{id}y_{id}f_{id}\}_{i}^{i+j+2},$$

where $$\rho_{jid} = \frac{N_{jid} \sum_{all jid} f(x,y)xy - \sum_{all jid} f(x)x \sum_{all jid} f(y)y}{N_{jid}(N_{jid}-1)\sigma_{x_{jid}}\sigma_{y_{jid}}}$$

$$= \beta_{jid} \frac{\sigma_{x_{jid}}}{\sigma_{y_{jid}}},$$

where $\sigma_x$ and $\sigma_y$ are segment standard deviations generated as $$\sigma_{x_{jid}} = \frac{\sqrt{N_{jid} \sum_{alljid} f(x)x^2 - \left[\sum_{alljid} f(x)x\right]^2}}{N_{jid}(N_{jid}-1)} \quad (37)$$

and $$\sigma_{y_{jid}} = \frac{\sqrt{N_{jid} \sum_{alljid} f(y)y^2 - \left[\sum_{alljid} f(y)y\right]^2}}{N_{jid}(N_{jid}-1)} \quad (38)$$

where $N_{jid}$ is the size of the respective correlation plot segment.

7. A method as defined in claim 4 in which the segment statistical correlation value ρ and the segment slope value β are generated as $$\rho(l_{id}^{i+j+2}) \rightarrow \rho \{x_{id}, y_{id}, f_{id}\}_1^{i+j+2},$$

where $$\rho_{jid} = \frac{N_{jid} \sum_{alljid} f(x,y)xy - \sum_{alljid} f(x)x \sum_{alljid} f(y)y}{N_{jid}(N_{jid}-1)\sigma_{x_{jid}}\sigma_{y_{jid}}}$$

$$= \beta_{jid} \frac{\sigma_{x_{jid}}}{\sigma_{y_{jid}}},$$

where $\sigma_x$ and $\sigma_y$ are segment standard deviations generated as $$\sigma_{x_{jid}} = \frac{\sqrt{N_{jid} \sum_{alljid} f(x)x^2 - \left[\sum_{alljid} f(x)x\right]^2}}{N_{jid}(N_{jid}-1)} \quad (42)$$

and $$\sigma_{y_{jid}} = \frac{\sqrt{N_{jid} \sum_{alljid} f(y)y^2 - \left[\sum_{alljid} f(y)y\right]^2}}{N_{jid}(N_{jid}-1)} \quad (43)$$

where $N_{jid}$ is the size of the respective correlation plot segment.

8. A signal processing system as defined in claim 1 further comprising a low-pass filter for performing a low-pass filter operation in connection with the digital data sequence generated by said sensor thereby to generate a low-pass filtered digital data sequence, the correlation integral value generation module generating the series of correlation integral values from the low-pass filtered digital data sequence.

9. A computer-implemented method for processing a digital data sequence representing an input signal to generate a fractal dimension value, said method comprising the steps of:

receiving an input signal, and sampling the input signal and generating the digital data sequence representing an amplitude value of said input signal at successive points in time;

generating a second series of correlation integral values for points wn(k) in "N"-dimensional space corresponding to overlapping vectors of said digital data sequence, each correlation integral value in said second series being generated as the number of inter-point distance values within each of a plurality of volume elements of said "N"-dimensional space;

generating a correlation integral plot comprising a plot of the correlation integral values as a function of said "N"-dimensional space volume elements;

generating, from the correlation integral plot, a third series of correlation integral plot segments, the segments of the series representing overlapped portions of the digital sequence;

generating, from each correlation integral plot segment in the segment, a tangent mapping comprising a best-fit linear curve defined by a segment statistical correlation value and a segment slope value, and saving the segment statistical correlation value having the largest value and the associated segment slope value; and determining whether the segment slope values generated during the successive iterations approach an asymptotic value and if so using the asymptotic value as the fractal dimension value, and if not adjusting at least one sampling parameter used by the sampler in sampling the input signal.

10. A method as defined in claim 9 in which, during the correlation segment generation step, correlation plot segments $S_{jid}$ are generated as:

$$S_{jid} = \{\{l_{id}^{i+j+w-2}\}_{j=1}^{Nd-w+1}\}_{i=1}^{Nd-j+2} \rightarrow (l_{id}^{i+j+w-2}) \rightarrow \{x_{id}, y_{id}, f_{id}\}_1^{i+j+w-2}$$

where "w" is the minimum segment size and "d" is the dimension.

11. A method as defined in claim 10 in which each correlation plot segments has a minimum segment size "w" of four.

12. A method as defined in claim 9 in which the correlation dimension generation step includes the steps of:

generating a tangent mapping for each correlation plot segment;

generating a segment statistical correlation value for each tangent mapping; and generating a segment slope value for each tangent mapping.

13. A method as defined in claim 12 in which a predetermined least-square fit procedure is used in generating the tangent mapping.

14. A method as defined in claim 9 further comprising a low-pass filter step for performing a low-pass filter operation in connection with the digital data sequence prior to said step of generating a second series of correlation integral values.

* * * * *

UNITED STATES PATENT AND TRADEMARK OFFICE
CERTIFICATE OF CORRECTION

| | | |
|---|---|---|
| PATENT NO. | : 5,696,700 | Page 1 of 1 |
| APPLICATION NO. | : 08/494674 | |
| DATED | : December 9, 1997 | |
| INVENTOR(S) | : Francis J. O'Brien et al. | |

It is certified that error appears in the above-identified patent and that said Letters Patent is hereby corrected as shown below:

Col. 2, line 57, change "2 (Cont. A)" to --2A-- and change "2 (Cont. B)" to --2B--.

Col. 2, line 60, change "2 (Cont. A)" to --2A--.

Col. 2, line 61, change "2 (Cont. B)" to --2B--.

Col. 2, line 62, change "2 (Cont. B)" to --2B--.

Figure 2A:
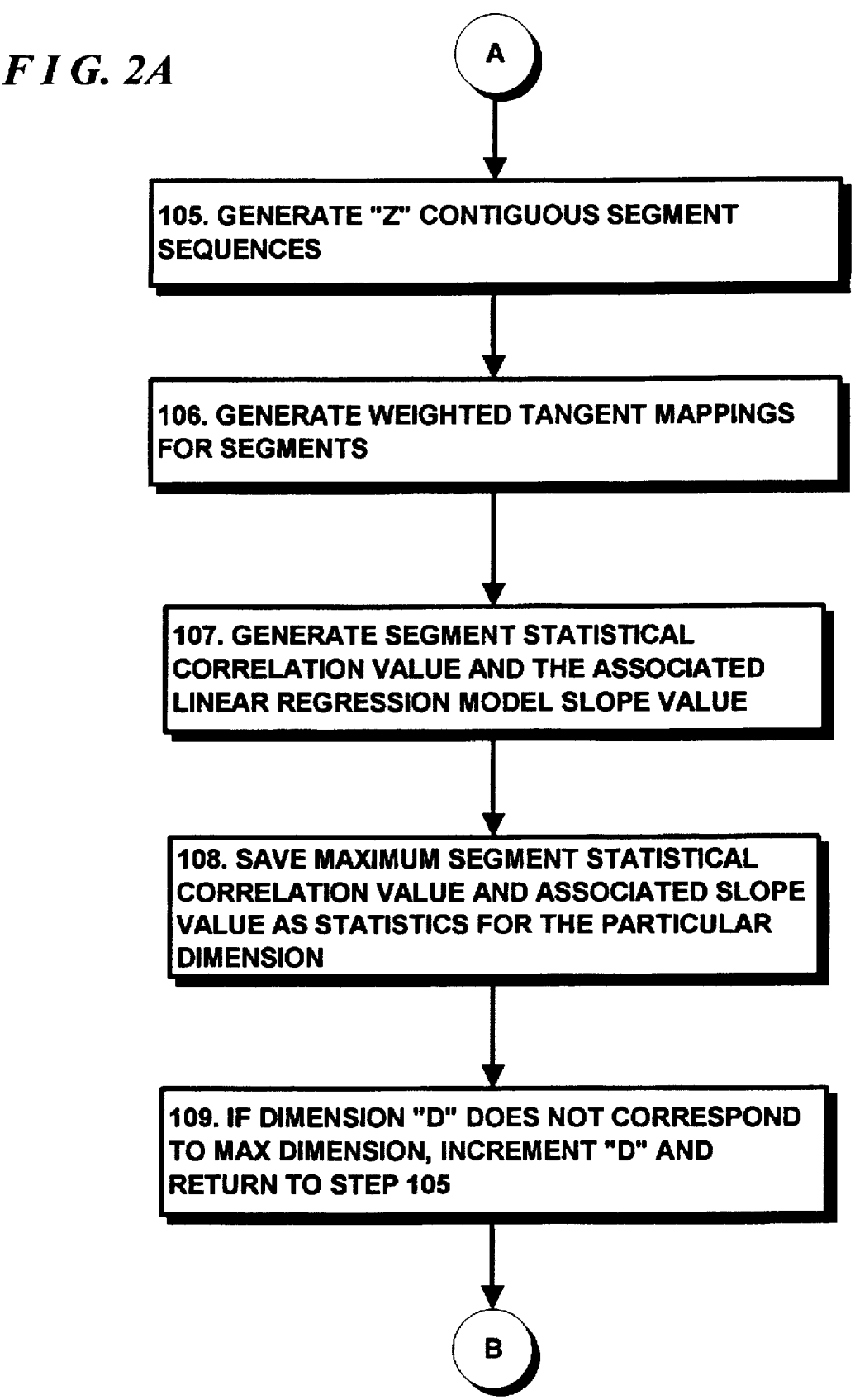
Figure 2B:
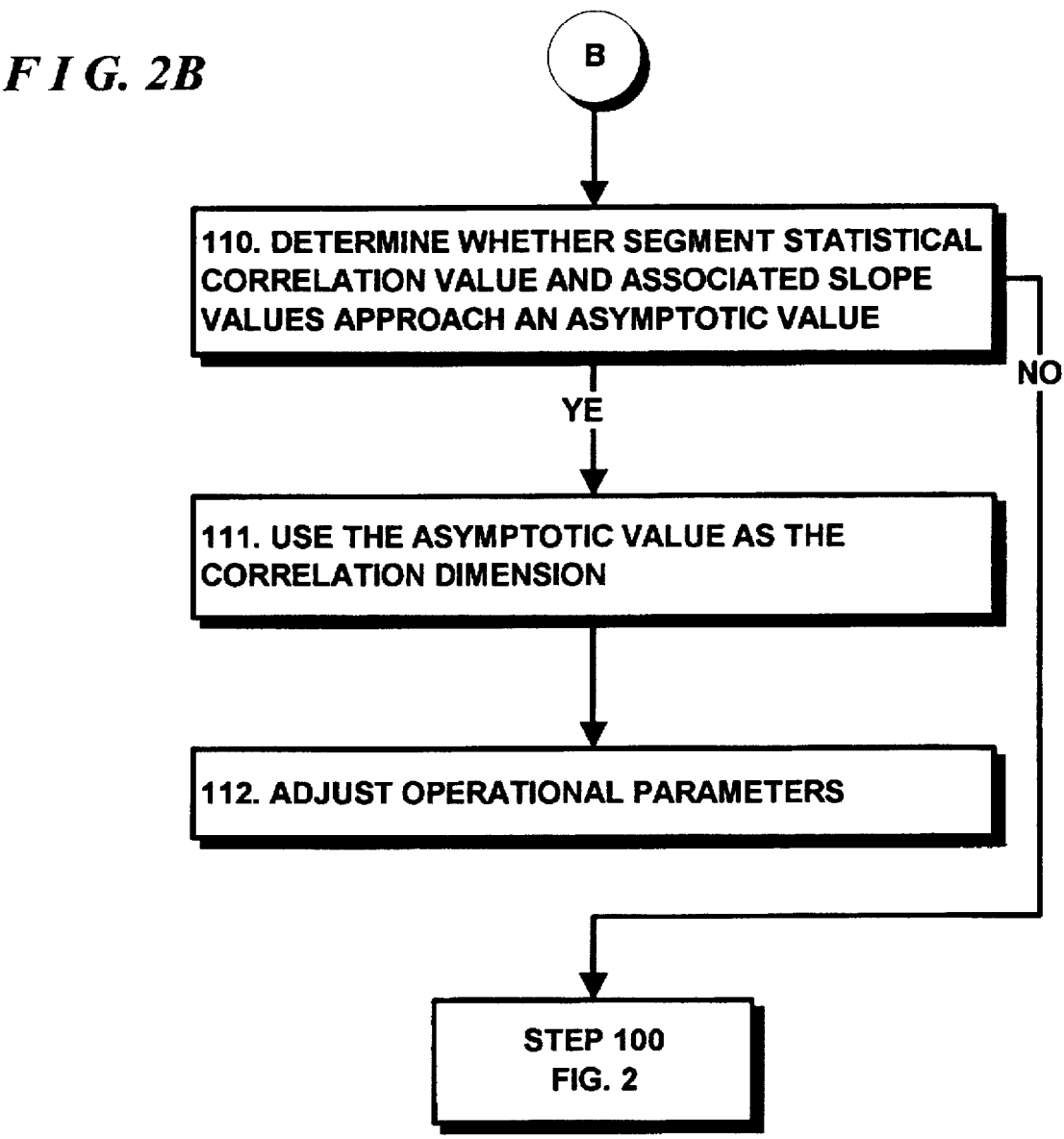

Col. 8, lines 11-12, change "FIGS. 2, 2 (Cont. A) and 2 (Cont. B)" to -- FIGS. 2, 2A and 2B--.

Signed and Sealed this

Fifth Day of December, 2006

JON W. DUDAS
*Director of the United States Patent and Trademark Office*